United States Patent [19]
Kojima

[11] Patent Number: 4,728,945
[45] Date of Patent: Mar. 1, 1988

[54] TABULATING SYSTEM
[75] Inventor: Masako Kojima, Fujisawa, Japan
[73] Assignee: International Business Machines Corporation, Armonk, N.Y.
[21] Appl. No.: 736,879
[22] Filed: May 22, 1985
[30] Foreign Application Priority Data
  May 19, 1984 [JP] Japan .................. 59-99725
[51] Int. Cl.⁴ ............................. G09G 1/00
[52] U.S. Cl. ................. 340/734; 340/724; 340/709
[58] Field of Search ........... 340/747, 721, 724, 723, 340/730, 710, 734, 709

[56] References Cited
U.S. PATENT DOCUMENTS

| | | | |
|---|---|---|---|
| 4,063,223 | 12/1977 | Schlis et al. | 340/709 |
| 4,291,305 | 9/1981 | Kimura et al. | 340/734 |
| 4,420,770 | 12/1983 | Rahman | 340/747 |
| 4,425,559 | 1/1984 | Sherman | 340/747 |
| 4,454,507 | 6/1984 | Srinivasan et al. | 340/709 |
| 4,517,658 | 5/1985 | Iida | 340/721 |

FOREIGN PATENT DOCUMENTS

| | | | |
|---|---|---|---|
| 0943213 | 3/1974 | Canada | 340/747 |
| 0999948 | 11/1976 | Canada | 340/747 |

OTHER PUBLICATIONS

Cusale, Malcolm S. et al, "An Overview of Analytic Solid Modelins", *IEEE C G & A*, Feb. 1985.

Primary Examiner—Marshall M. Curtis
Attorney, Agent, or Firm—Frederick D. Poag

[57] ABSTRACT

The described embodiment provides listing control on a cathode ray tube (CRT) display for simultaneously drawing horizontal and vertical grid lines within a square box displayed on the CRT screen by moving a cursor to the intersection point of these grid lines and by pressing an ENTER key.

The embodiment uses a current position counter, a starting point counter and ending point counter to selectively set flag bits for horizontal and vertical grid lines stored in a logical page buffer so that the horizontal and vertical grid lines passing through the intersection point can be simultaneously displayed on the CRT screen. The embodiment uses the counters to define two end points on a diagonal line of the square box and to define the intersection point within the square box, whereby the flag bits are selectively set in accordance with the contents of these counters.

4 Claims, 16 Drawing Figures

TABULATING SYSTEM

BACKGROUND OF THE INVENTION

1. Field of the Invention

This invention relates to a tabulating system in a word processor and the like having a display, and more particularly to a tabulating system that enables the drawing of vertical and horizontal grid lines with less movements of a cursor than in a tabulating system of prior art.

2. Prior Art

There is a prior tabulating system wherein two points are specified, by a cursor on a diagonal line of a rectangular box. The two points serve as a start and an end point to draw the rectangular box surrounding a table on a screen of a display. Although this tabulating system enables the drawing of the rectangular box by specifying only two points with the cursor, it is required that respective start and end points of vertical and horizontal grid lines be specified with the cursor when they are successively drawn in the rectangular box. Therefore, there is inconvenience to the operator in operation because it is required to move the cursor from the top end to the bottom end of the box, or the left end to the right end again and again.

SUMMARY OF THE INVENTION

It is an object of the invention to provide an improved tabulating system that is designed to draw vertical and horizontal grid lines simultaneously by specifying a single point with the cursor in a rectangular box drawn on a screen of a display, to eliminate such disadvantage of the conventional tabulating system.

To this end, the tabulating system according to the invention comprises a key entry means, a display having a plurality of character boxes on a display screen, a memory means having a plurality of addressable memory locations at least corresponding to said character boxes, each of the locations storing flag bits for vertical and horizontal grid lines a part of attribute codes indicating display conditions of a corresponding character box, a current location counter for storing both of current horizontal and vertical locations of a cursor, a start point counter for storing both horizontal and vertical locations of the cursor at a start point when one of two end points on a diagonal line of a rectangular box to be displayed on said display screen is specified as the start point by said key entry means, an end point counter for storing horizontal and vertical locations of the cursor at an end point when another point of said end points is specified as the end point by said key entry means, and a control means for selectively setting said flag bits according to contents of said current location counter, said start point counter of said end point counter so that, when a point in said rectangular box is specified as an intersection point by said key entry means, vertical and horizontal grid lines passing through said intersection point are displayed on said display screen within said rectangular box.

EMBODIMENT OF THE INVENTION

Now an embodiment of the invention is described referring to the attached drawings.

Figure 1:
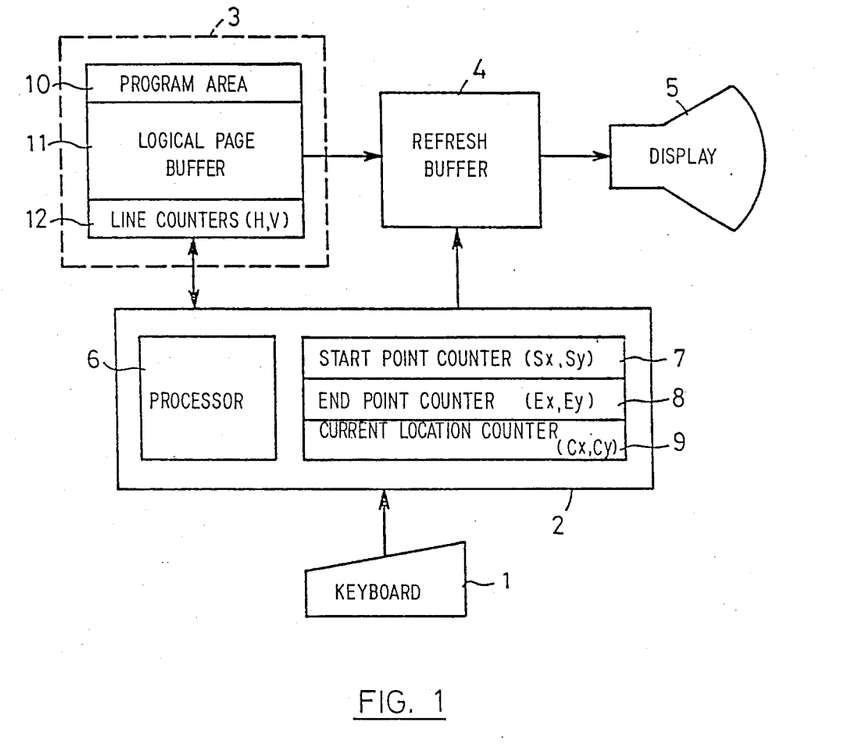
FIG. 1 shows a block diagram illustrating a configuration of an embodiment of the invention.

FIG. 1 shows schematically major components of a word processor suitable for embodying the invention.

As shown, the word processor consists of a keyboard 1, a controller 2, a main memory 3, and refresh buffer 4 and a display 5 of a cathode ray tube (CRT).

The keyboard 1 has a conventional configuration, and has a number of character entry keys and function keys. The function keys include a grid line mode key specifying grid line mode, a cursor movement key specifying the direction of cursor movement, an enter key used for specifying the start point, the end point, and the intersection point of grid lines, description of which keys is omitted because they are well known in the art.

The controller 2 processes data supplied from the keyboard 1 according to a program that is stored in a program area 10 of the main memory 3, and includes a processor 6 and counters 7-9 for storing information on the locations of the cursor. The location information of the cursor stored in the counters 7-9 is updated by the processor 6 according to keying of the cursor movement key on the keyboard 1. Operations relating to these counters 7-9 are described later in detail.

A logical page buffer 11 provided in part of the main memory 3 has a plurality of memory locations at least corresponding to the number of character boxes on the screen of the display 5, and stores character information and control information supplied from the keyboard 1 in a predetermined format under control of the controller 2. In other words, each memory location in the logical page buffer 11 stores a character code representing a character or a symbol to be displayed on the screen of the display 5, and an attribute byte representing an attribute (reverse, high-intensity, cursor, etc.) of said character or symbol, in a pair. However, it is assumed for convenience of the description that a vertical grid line (V) bit and a horizontal grid line (H) bit that are part of the attribute byte are stored on separate line counters 12.

Figure 2:
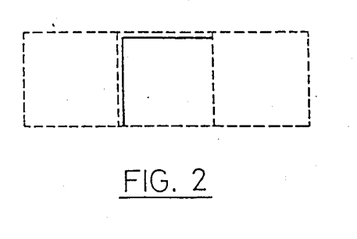
FIG. 2 shows vertical and horizontal lines displayed at the left and the upper sides of a character box, respectively, according to two attribute bits.

The refresh buffer 4 has a plurality of memory locations corresponding to the number of character boxes on the screen of the display 5. Each of these memory locations stores a character code representing a character or a symbol to be displayed in each character box, and an attribute byte for the character code, in a pair. In this embodiment, it is assumed that a vertical line and a horizontal line can be independently displayed at the left side and the upper end of a character box, respectively, by using the vertical grid line (V) bit and the horizontal grid line (H) bit in the attribute byte (see FIG. 2). However, the character boxes indicated by dotted lines in FIG. 2 are not usually displayed.

Now referring to FIGS. 3 and 4A through 4G, what display is performed on the screen of the display 5 is described, and then the details of each component shown in FIG. 1 are described.

Figure 3:
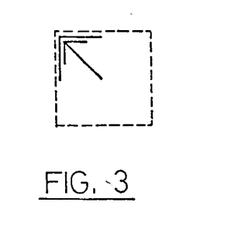
FIG. 3 shows a pattern of a graphic cursor.

When the operator presses the grid line mode key on the keyboard 1, a grid line specifying menu is displayed on the screen of the display 5. Then, when a tabulating mode is selected on the menu, the word processor enters into the tabulating mode. In this case, a graphic cursor as shown in FIG. 3 is displayed on the screen of the display 5. The operator moves the graphic cursor to a desired location on the screen by pressing the cursor movement key, and specifies the start point and then the end point of a grid line, respectively, by pressing the enter key on the keyboard 1. When it is intended to draw a rectangular box, the start point of the grid line may be any one for the upper left, the lower left, the upper right or the lower left corners of the box. A point on a diagonal line opposed to the start point becomes the end point. In other words, one of two end points of a grid line to be displayed that is first specified is the start point, while the end point that is specified later is the end point of a grid line. In the following, it is assumed for convenience of the description that the upper left corner of the rectangular box is specified as the start point. In that case, the end point is specified by moving the graphic cursor to the right and the bottom of the rectangular box. The function up to now is the same as that in the conventional tabulating system. Then, the operator presses the cursor movement key to move the graphic cursor to a point within the previously specified rectangular box, then presses the enter key to specify it as an intersection point of vertical and horizontal grid lines to be drawn in the box. This operation is continued until the operator stops (for example, by pressing a cancel key on the keyboard 1).

To understand the above operation more clearly, it is described in more detail by referring to examples in FIGS. 4A through 4F. This example is to finally display a table as shown in FIG. 4G. First, the operator moves the graphic cursor to the location of the upper left corner of a rectangular box not yet displayed on the screen, and presses the enter key to specify that location as the start point (see FIG. 4A). It is noted that dotted lines in the Figure indicate the character boxes. Then the graphic cursor is moved to the lower right corner of the rectangular box, which is specified as the end point by pressing the enter key in the same manner as in the above (see FIG. 4B). Thus, the rectangular box is immediately displayed on the screen (see FIG. 4C). The graphic cursor is then moved to a point within the box, which is specified as an intersection point by pressing the enter key (see FIG. 4D). This causes a vertical line and a horizontal line passing through the intersection point to be immediately displayed in the rectangular box (see FIG. 4E). The desired table as shown in FIG. 4G is formed on the screen by successively moving the graphic cursor as in FIG. 4F, and correspondingly specifying intersection points.

To display the grid lines as above, the controller 2 in FIG. 1 uses the following counters:

Start point counter (Sx, Sy) 7
End point counter (Ex, Ey) 8
Current location counter (Cx, Cy) 9
Line counters (H, V) 12

Figure 5:
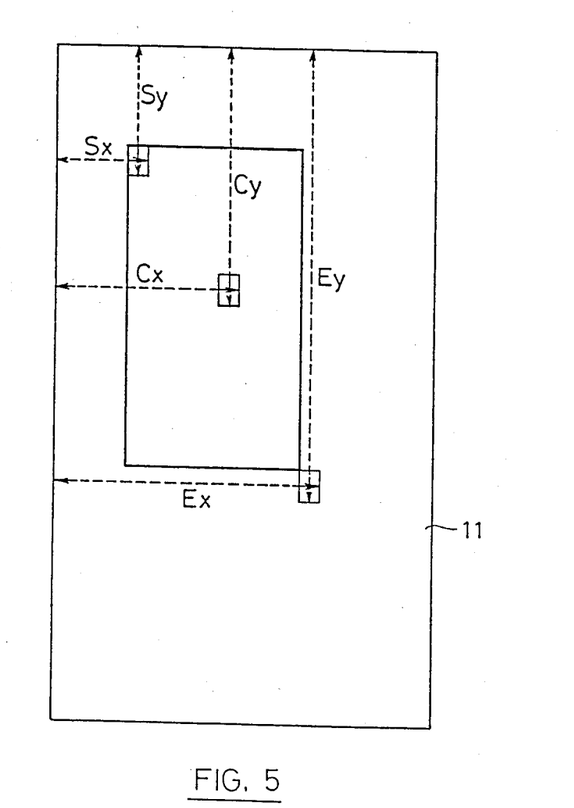
FIG. 5 shows a correlation of contents of the start point counter, the end point counter and the current location counter.

The subscript "X" in the first three counters indicates the number of column from the left end of a logical page stored in the logical page buffer 11, while the subscript "y" indicates the number of row or line from the start line of the logical page (see FIG. 5).

Figure 6:
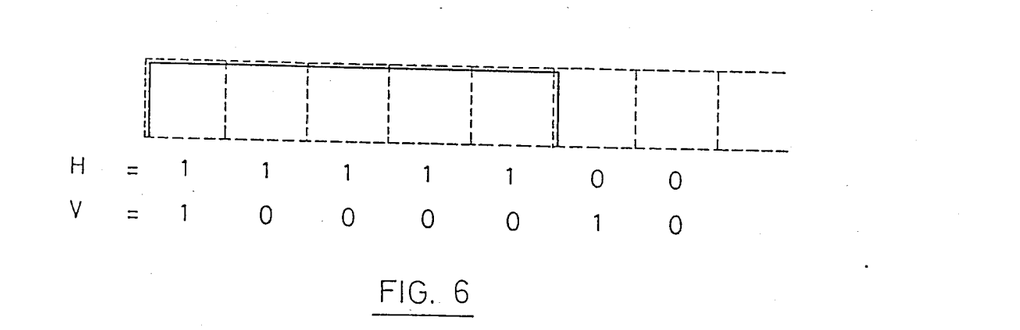
FIG. 6 shows correspondence of the content of the line counter and the displayed pattern.

A pair of line counters 12 are used for each of displayed lines, and one of the paired counters 12 contains the horizontal grid line bit H=1 if it is required to display a horizontal line at the upper end in each character box for corresponding displayed lines, or the other of the paired counters 12 contains the vertical grid line bit V=1 if it is required to display a vertical line at the left end (see FIG. 6). Now the tabulating procedure according to the invention is described in more detail by referring to FIGS. 7A through 7D.

First when the operator presses the grid line mode key on the keyboard 1, this action causes the processor 6 in the controller 2 to start the program stored in the program area 10 of the main memory 3 to display the grid line specifying menu on the screen of the display 5 (Step 20). When the operator selects the tabulating mode on the menu, the word processor enters in the tabulating mode. Then pressing the cursor movement key on the keyboard 1 updates content of the current location counter 9 according to the moving direction of the graphic cursor under control of the processor 6. In this case, when the operator specifies the start point by pressing the enter key at a desired location, the content of the current location counter 9 indicating the cursor location at that moment is set in the start point counter 7 (Step 23). Then when the end point is specified, the content of the current location counter 9 indicating the cursor location at that moment is set in the end point counter 8 (Step 26). Next, by calling S1 routine of FIG. 7C (Step 28), contents of the line counters 12, corresponding to each of line Sy to line Ey in the logical page buffer 11, are separately set. That is, all H bits for columns Sx to Ex−1 are set to be on in the line counters 12 corresponding to two lines of Sy and Ey (Steps 38 and 42), and two V bits for columns Sx and Ex are set to be on the line counters 12 corresponding to all lines from Sy to Ey−1 (steps 43 and 44). It is noted that "N" and "M" in Steps 37 and 39 of FIG. 7C indicate work areas in the main memory 3 that are used for S1 routine.

The processor 6 in the controller 2 read the H and the V bits set in each of the line counters 12 by a grid line creating program, and selectively sets the attribute bits representing the left vertical line and the upper horizontal line of each character box at the corresponding attribute byte locations in the refresh buffer 4 (Step 29).

Figure 4A:
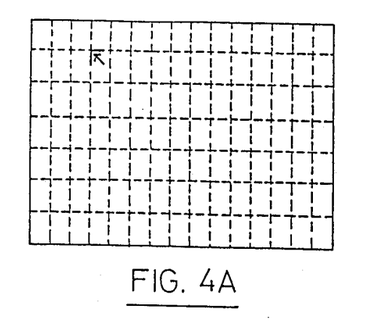
FIGS. 4A through 4G show the creation processes on the display screen.
Figure 4B:
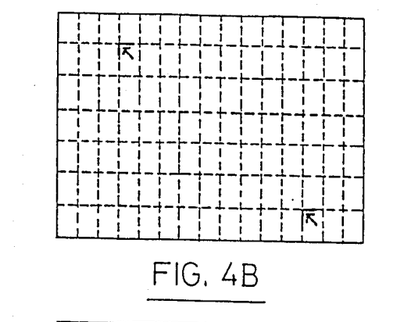
Figure 4C:
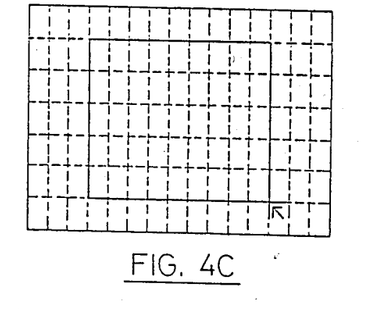
Figure 4D:
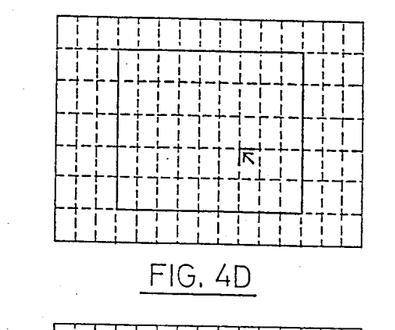
Figure 4E:
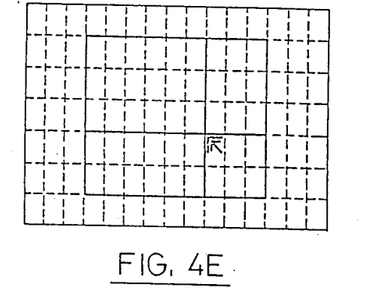
Figure 4F:
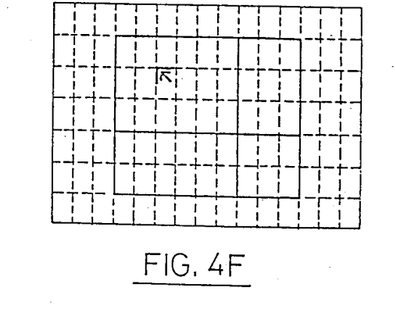
Figure 4G:
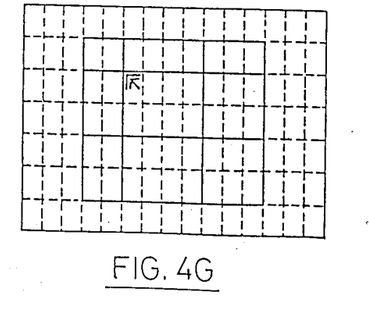

Thus, the rectangular box as shown in FIG. 4C is displayed on the screen. Up to this stage, the procedure is the same as that of the conventional tabulating system.

Figure 7A:
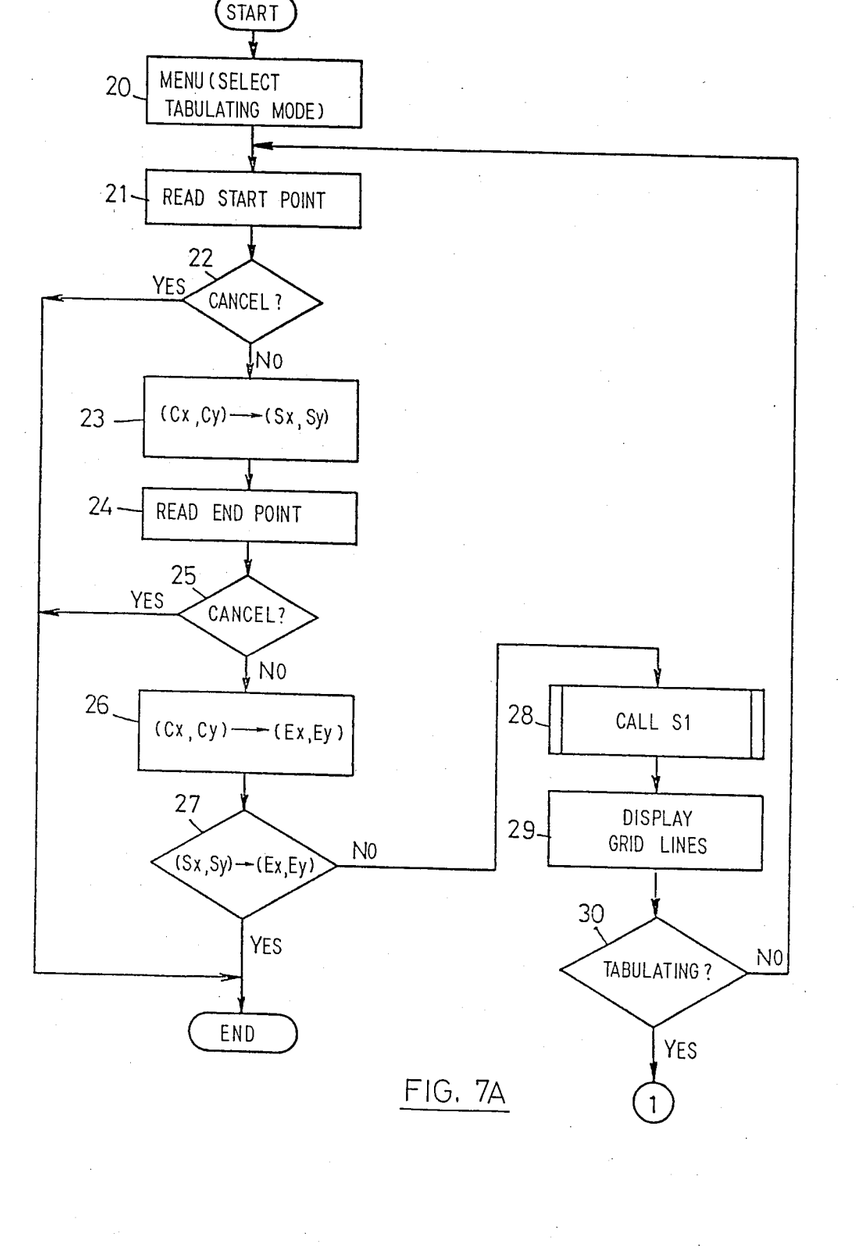
FIGS. 7A through 7D show flowcharts illustrating the tabulating procedures of the invention.
Figure 7B:
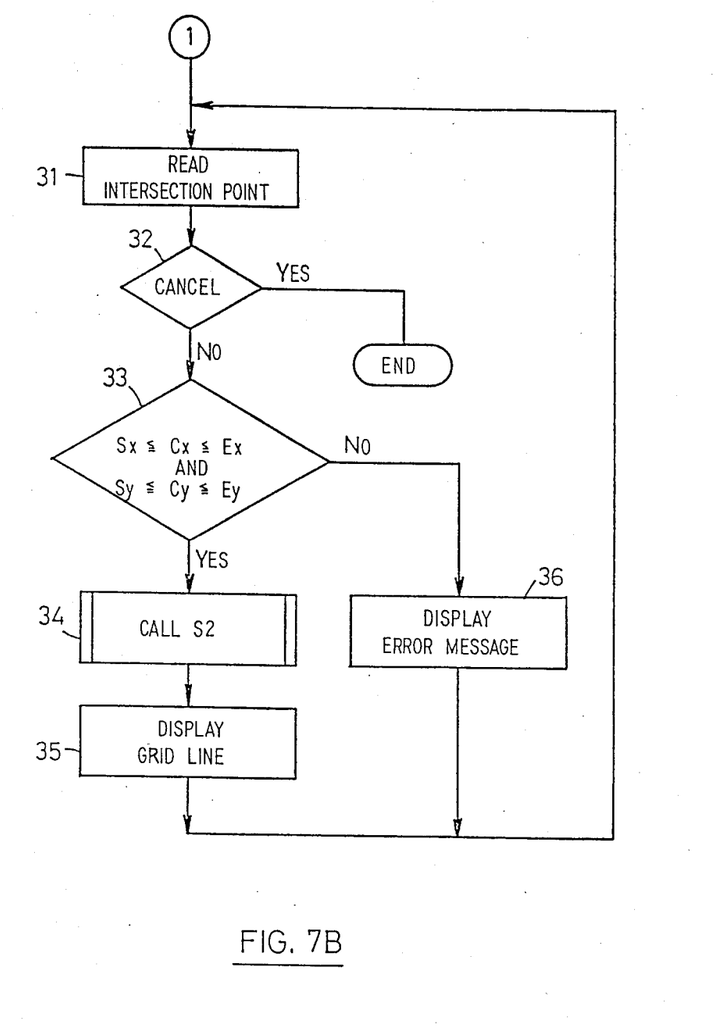
Figure 7C:
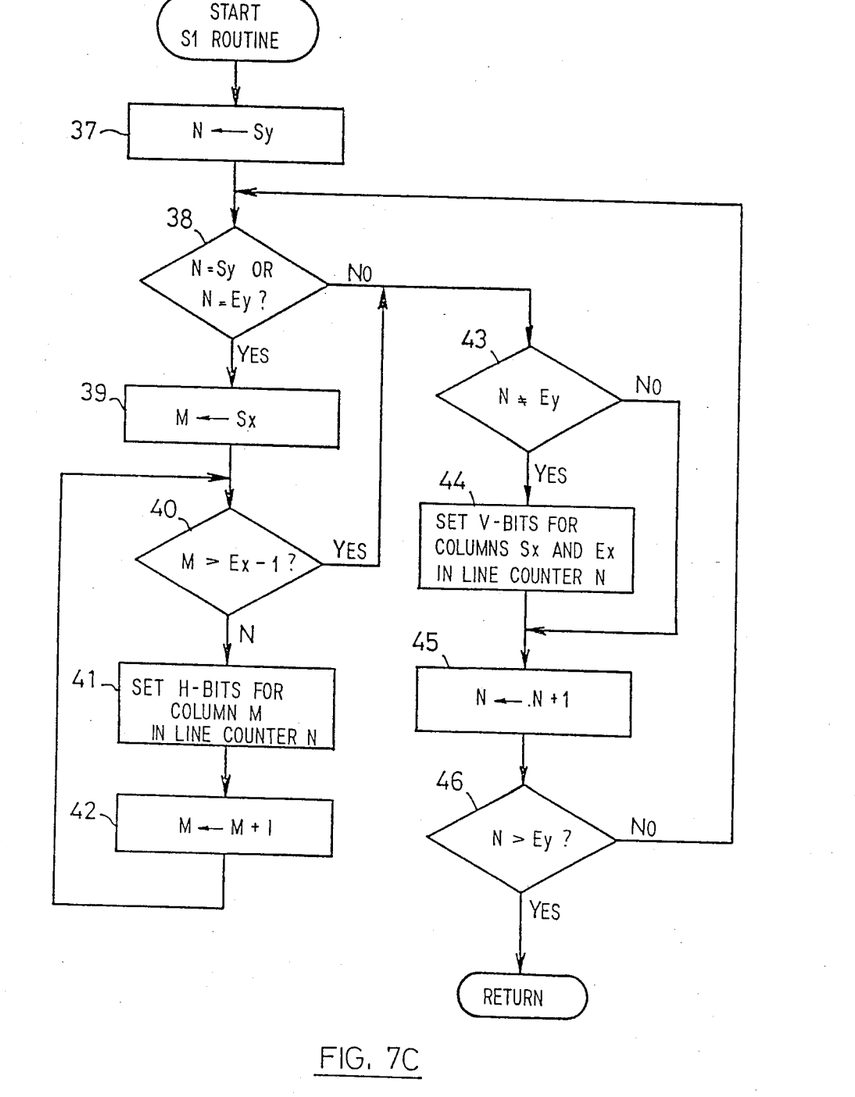
Figure 7D:
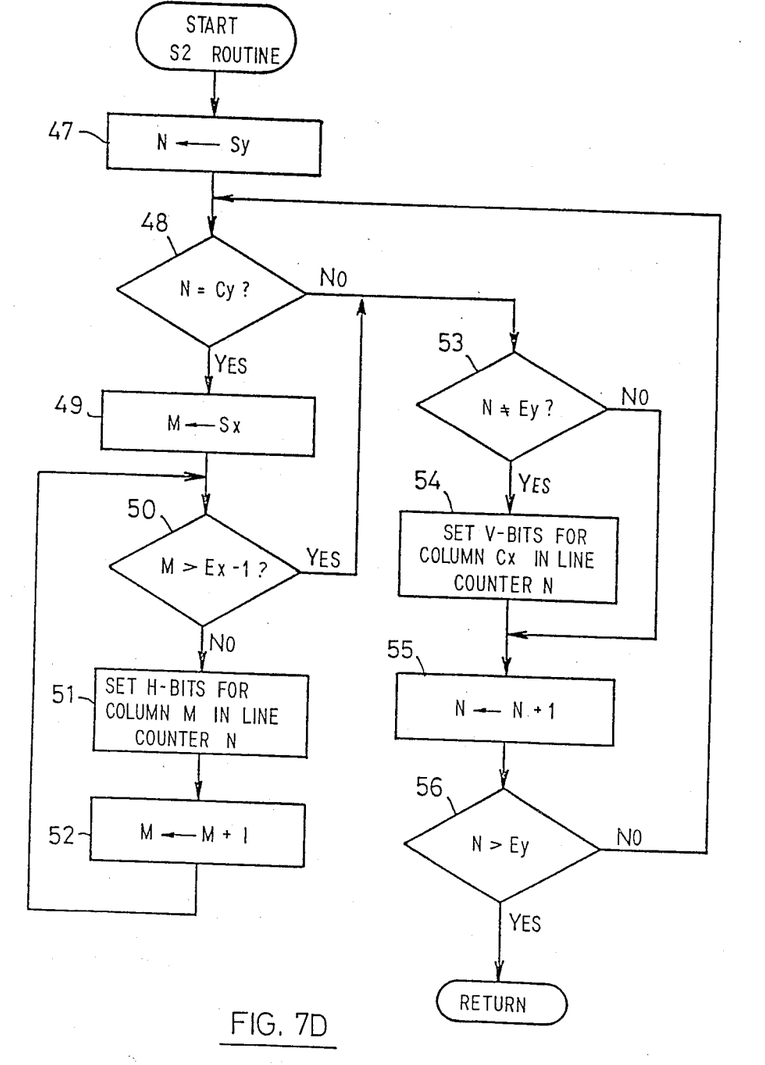

Then, when an intersection point is specified as shown in FIG. 7B, if the content (Cx, Cy) of the current location counter 9 indicating the cursor location at that moment satisfies:

$Sx \leq Cx \leq Ex$ and $Sy \leq Cy \leq Ey$ (Step 33), or if the graphic cursor indicates the rectangular box or the inside thereof, the contents of the line counters 12 corresponding to each of lines Sy to Ey in the logical page buffer 11 are updated by calling S2 routine of FIG. 7D (Step 34). The S2 routine sets all H bits for columns Sx to Ex−1 to be on in the line counter 12 corresponding to line Cy (Steps 48 through 52), and sets V bits for column Cx to be on in the line counters 12 corresponding to all lines from Sy to Ey−1 (Steps 53 and 54).

Then, the processor 6 in the controller 2 read the content of each line counter 12 set as described above, and selectively sets the attribute bits representing the left vertical line and the upper horizontal line of each character box to be on at the corresponding attribute location in the refresh buffer 4 (Step 35).

By repeating Steps 31 to 35, the table as shown in FIG. 4G is ultimately displayed on the screen.

If an intersection point is specified to be Sx=Cx or Ex=Cx, only a vertical line is drawn in the rectangular box, while, if its specified to be Sy=Cy or Ey=Cy, only a horizontal line is drawn in the rectangular box.

As described, the invention enables the user to draw vertical and horizontal lines simultaneously only by specifying a point in a rectangular box with the cursor, and thus to efficiently create a table in a word processor and the like.

We claim:

1. A tabulating system comprising: a key entry means; a display having a plurality of character boxes on a display screen; a memory means having a plurality of addressable memory locations corresponding to said character boxes, each of the locations storing flag bits for vertical and horizontal grid lines as part of attribute codes indicating display conditions of a corresponding character box; a current location counter for storing both of current horizontal and vertical locations of a cursor; means for identifying a start point, an end point and an intersection point; a start point counter for storing both of horizontal and vertical locations of the cursor at a said state point to identify one of two end points on a diagonal line of a rectangular box to be displayed on said display screen; and end point counter for storing horizontal and vertical locations of the cursor at a said end point to identify the other of said two end points;

characterized in that said tabulating system includes a control means arranged in operation to selectively set said flag bits in those of said attribute codes corresponding to character boxes identified by the contents of said current location counter, said start point counter and said end point counter including means for determining that a point identified by the contents of said current location counter is coincident with the area of said rectangular box and is specified as a said intersection point by said key entry means, said display means being responsive to said flags to show on said screen vertical and horizontal grid lines passing through said intersection point within said rectangular box.

2. A listing system comprising:
key input means;
display means having a plurality of character boxes on its display screen;
storage means having a plurality of addressable storage positions corresponding to said character boxes, each of the storage positions storing flag bits for horizontal and vertical grid lines as a portion of an attribute code indicating displaying conditions of the corresponding character box;
a current position counter for storing current horizontal and vertical positions of a cursor;
a starting point counter, responsive to said key input means specifying one of two end points on a diagonal line of a rectangular box on said display screen as a starting point, for storing horizontal and vertical positions of the cursor at the starting point;
an ending point counter, responsive to said key input means specifying the other of said end points as an ending point, for storing horizontal and vertical positions of the cursor at the ending point;
control means, responsive to said key input means specifying a given point in said box as an intersection point, and including means for determining that said intersection point is coincident with the area of said box and arranged in operation to selectively set said flag bits for grid lines identified by the contents of said current position counter defining said intersection point, and said starting point counter and said ending point counter defining said rectangular box,
said display means being responsive to said flag bits to display on said display screen horizontal and vertical grid lines passing through said intersection point in said rectangular box to the limits of said rectangular box wherein said control means limits the extent of said horizontal and vertical grid lines to the confines of said box.

3. A tabulating system in accordance with claim 2, wherein said box is displayed on said display screen.

4. A tabulating system in accordance with claim 3, wherein said control means is arranged in operation when said intersection point coincides with the upper or lower edges of said square box to display a vertical grid line, and
when said intersection point coincides with left or right edges of said square box to display a horizontal grid line, and
when said intersection point is located interiorally of said box to display both vertical and horizontal grid lines,
said storage means being operative to retain said flag bits so as to build up a succession of said grid lines on said screen by iterative operation of said control means.

* * * * *